Nov. 15, 1955 B. B. STOLLER 2,723,493
METHOD OF MAKING COMPOSTS AND FOR GROWING MUSHROOMS
Filed Feb. 21, 1951 2 Sheets-Sheet 2

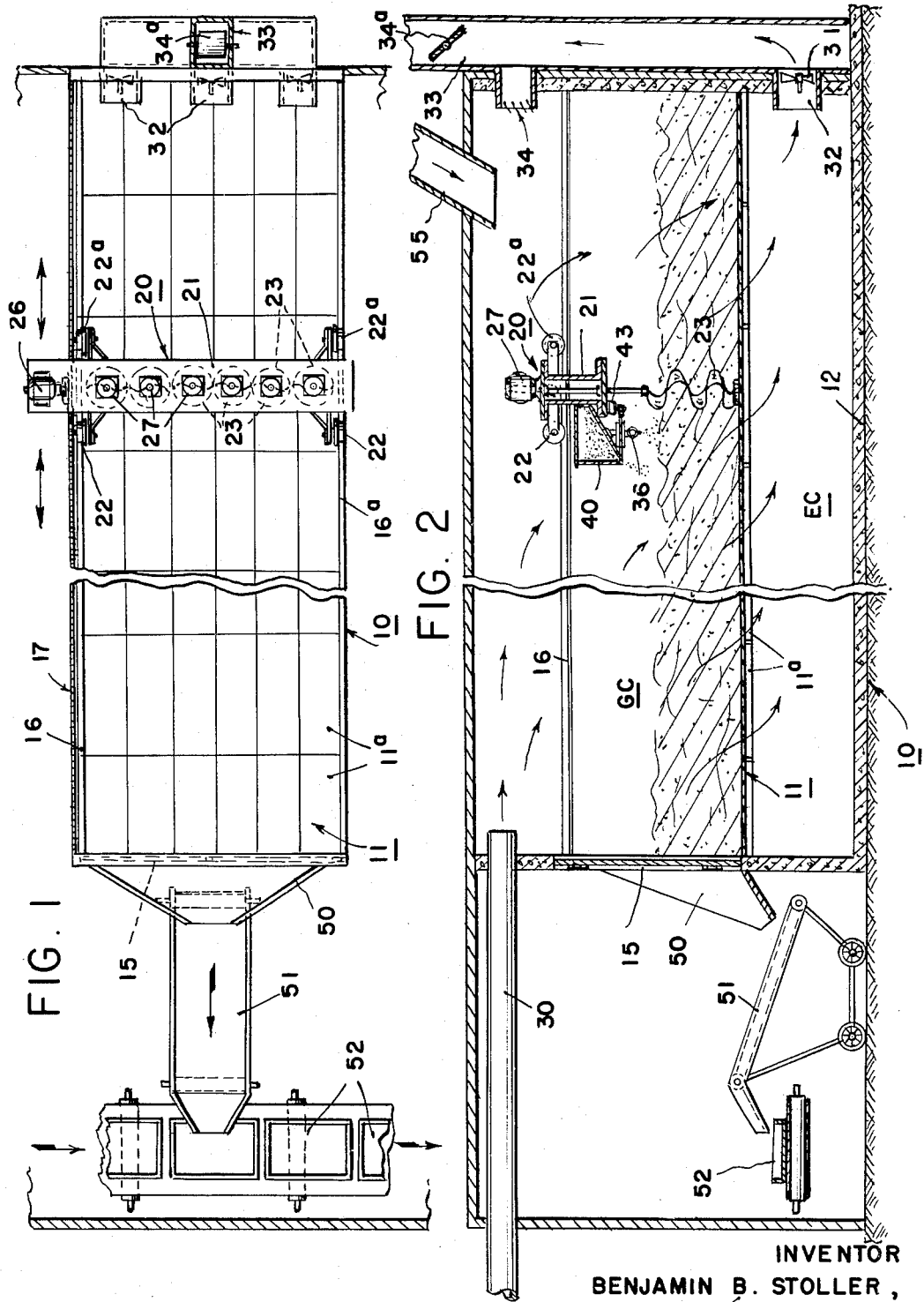

INVENTOR
BENJAMIN B. STOLLER,
BY
ATTORNEY

United States Patent Office 2,723,493
Patented Nov. 15, 1955

2,723,493

METHOD OF MAKING COMPOSTS AND FOR GROWING MUSHROOMS

Benjamin B. Stoller, Milwaukee, Wis.

Application February 21, 1951, Serial No. 212,069

19 Claims. (Cl. 47—1.1)

This invention relates to improvements in method of making composts and for growing mushrooms commercially.

It is an object of the invention to provide methods of preparing a compost which is homogeneous with respect to microbial decomposition of cellulosic, organic materials; which is uniform with respect to distribution of inorganic and organic ingredients, moisture and acidity; and in which undesirable microflora and insects are destroyed by a rapid, thermophilic fermentation.

A further object of the invention is the provision of methods for growing the mushroom spawn after the completion of the thermophilic fermentation of a compost by a continuity of numerous centers of inoculation, so that the spawn permeates or grows through the compost rapidly under ideal conditions of aeration and relative humidity.

A further object of the invention is the provision of a method of recovering valuable biochemicals synthesized by the microbial activity taking place within a compost or the like prior to or after the thermophilic fermentation thereof, either before inoculation with mushroom spawn, or if the yield and value of the biochemical derived is sufficiently great, without further use of the compost.

Yet another object of the invention is the provision of a method of drying compost after the completion of the fermentation thereof, and more particularly to dry the compost which has been permeated with spawn after inoculation and growth of the spawn into the compost, so that the compost or compost with spawn may be stored and/or shipped.

It is a further object of the invention to provide simple, practical and readily available apparatus in which said methods may be performed. Other objects and advantages of the invention will appear hereinafter.

The present invention represents a practical improvement in the method of and apparatus for preparing a compost previously described in an article by F. B. Smith, P. E. Brown and myself, entitled "A Mechanical Apparatus for the Rapid, High-Temperature Microbial Decomposition of Fibrous, Cellulosic Materials in the Preparation of Composts for Mushroom Culture" (Jour. Amer. Soc. Agron. vol. 29; 717–723, 1937). The principle of the method described in the aforesaid article was that of maintaining uniform moisture of the compost, conserving the heat generated by the thermophilic fermentation, maintaining good aeration without excessive drying or cooling effects, and revolving the fermenting mass so as to obtain the proper moisture, temperature, and aeration in every part of the compost. In carrying out this principle, it was planned to control the aeration, moisture, temperature and acidity of the compost in order to obtain a rapid, high-temperature decomposition of manures for the production of composts. The apparatus constructed to put this method into practice was a revolving drum with baffles protruding from the inner sides, the baffles serving to break up the fermenting mass as it turned when the drum was revolved. Air and water were supplied through perforations in the central shaft. While it was shown that the principle involved was well-founded, the method and the apparatus were found impractical under commercial conditions. As stated in this publication, "The cost of an apparatus of this kind may prove a serious disadvantage, but a practical modification may be possible."

The disadvantages implied in the connotation of high cost of equipment to prepare a product of low value such as composts, are as follows: (1) Discrete units, such as the revolving drums, made of costly iron or specially formed wood, and operated by individual sets of machinery. (2) The space in the building housing these units is occupied to a large extent by the equipment, so that less of this space is available for the bulk of the material used in preparing the product. (3) The amount of machinery per unit capacity for manufacturing is high. (4) The full capacity of the drums is not realized because the drums are filled only to about one-half of their volume in order to obtain the proper turning of the fermenting mass. Other features of disadvantage of the prior method and apparatus brought to light during extended investigation thereof were, to continue, as follows: (5) Aeration throughout the mass could only be maintained when the fermenting mass was turned by the revolving drum. (6) There was incomplete control of the temperature of the fermenting mass when it was broken up while the drum revolved. (7) Emptying and cleaning the drum of a non-flowing material like compost was relatively difficult, especially when mushroom spawn was also to be grown in the same apparatus, as will be described as a feature of the present invention.

In the article by Smith, Brown and myself, cited above, it is stated: "When the apparatus was not revolved, strata appeared in the compost. That is, the manure did not decompose uniformly throughout the mass but layers appeared in which the moisture content, percentage of ash, and microflora were different. The layer of manure immediately surrounding the shaft where the air entered the apparatus was permeated with a heavy growth of 'firefang.' The temperature and concentration of carbon dioxide were highest in this layer (Table 4). Surrounding this was a layer of yellow strawy material (25% moisture) which showed little or no decomposition. Surrounding the strawy layer was a layer of brown manure which contained 60 to 80% moisture and little or no 'firefang.' Free moisture collected at the bottom of the churn." From this quotation, it appears that when the compost is not thoroughly mixed, the temperature, moisture, and aeration are not uniformly distributed throughout the mass. As a result, insects and disease microorganisms would survive in the cooler parts of the tank.

It will be evident from the foregoing discussion that the present method and apparatus is useful to produce a homogeneous compost by a rapid, thermophilic fermentation in which the fibrous materials are decomposed uniformly, the acidity and moisture are uniform throughout the compost, and insects and disease microflora are destroyed, which is the subject matter of the present invention.

Proceeding now to a detailed description of the methods and apparatus of the invention, reference will be had to the accompanying drawings illustrating a preferred embodiment of apparatus for carrying out the methods herein contemplated, wherein—

Fig. 1 is a plan view of the apparatus;

Fig. 2 is a section taken along the longitudinal center line of Fig. 1;

Figure 3:
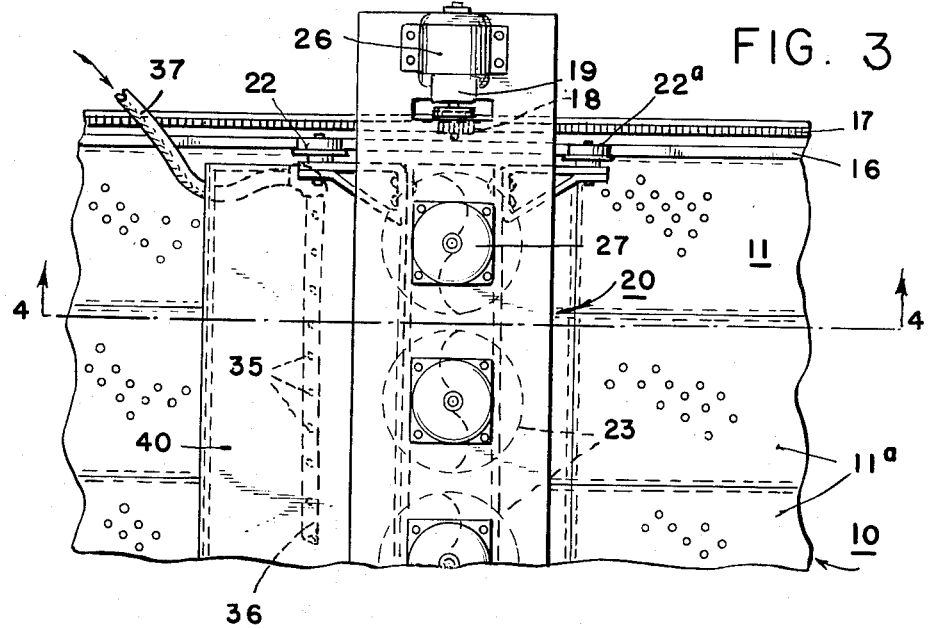
Fig. 3 is an enlarged fragmentary plan view illustrating the turning machine and accessory equipment.

In said figures, reference numeral 10 generally designates a rectangular tank which is open at the top and has a perforated floor or "false bottom" 11 spaced above its main bottom or floor 12. The portion of the tank above the perforated false bottom, which latter may be formed by a plurality of removable, perforated trays 11a, is designated as the fermenting and growing compartment GC, and the portion between the false and main bottoms is designated as the exhaust chamber EC. The tank may be built to convenient size, preferably 12' to 20' by 100' to 300'. The height of the fermenting and growing compartment GC may be 3' to 10' and the height of the exhaust air chamber EC 2' to 8'.

The rectangular tank 10 is housed in a suitable building with insulated and waterproofed walls and ceiling, the ceiling being preferably built low in order to conserve the heat generated by the thermophilic fermentation. One or several tanks may be housed in the same building, and there may be a series of tanks on each floor of the building. It is preferable, however, that each tank be separated or partitioned off from others in the same building.

The perforated floor trays 11a are made preferably of galvanized iron and the perforations may be of any shape, but the size of the perforations should be sufficiently small that only the finest particles of compost will fall through. The trays are supported and arranged so that they are easily removable and can be arranged for automatic dumping. The sides, ends and bottom of the tank are preferably built of concrete, the sides and ends being 6" to 8" thick, but one end wall is left open for the height of the compartment GC. A removable door 15 is built into this open end. Iron rails 16, 16a are affixed to the top of the side walls and extend the entire length of the compartment so as to provide a track. A longitudinal rack 17 is also affixed to the top of one (or both) of the side walls, which in the illustrated embodiment is that on which the rail 16 is disposed (Fig. 3).

A turning machine 20 is mounted on the track and comprises a cross beam 21 extending the full width of the compartment GC, the beam being supported at each end by two supporting wheels 22, 22a which run along the track. The wheel assembly running on the rail 16 of the track also includes a driven pinion 18 meshing with the rack 17, the pinion being driven through suitable reduction gearing 19 from a prime mover to be described. A plurality of vertical screw-type turners 23 are mounted on the beam to extend to the false bottom 11 of the compartment. The number of turners will vary with the width of the compartment; preferably there should be six to twelve turners and they are uniformly spaced so that an entire width zone of the compost is completely turned when all of the turners are in operation. The type of turner blade employed will vary with the nature of the compost being prepared, but in general the blade structure will be such that the turner acts as a huge corkscrew or as a screw having solid spiral blades. To the blade at the end of the spiral is attached a leather or thick cord scraper 25 which in wiping across the holes of the perforated floor trays 11a clean them as the turning machine moves along the track.

The turning machine 20 is propelled back and forth along the length of the tank 10 by a prime mover 26 which drives the pinion 18 in mesh with the rack 17 as aforesaid, and said prime mover may be an electric motor or a gas engine mounted on the cross beam 21, or the turning machine may be powered by a motor at the end of the building and driving through a system of belts and pulleys. The turning machine is geared down to travel at the rate of 100' to 200' per hour, but this rate will vary with the nature of the compost, moisture in the compost and the microflora permeating the compost. The turners 23 may be individually driven by motors 27 mounted on the cross beam 21, through suitable reduction gearing, or by the prime mover 26 or by any other suitable source of power. The turners are operated so that the compost is thoroughly mixed by bringing the compost at the bottom of the compartment to the top thereof and the compost at the top to the bottom. Accordingly, a preferred arrangement is that alternate turners rotate in opposite direction to that of the intermediate turners.

Upon the turning machine 20 being placed in operation, it will travel back and forth for substantially the full length of the tank, with the turners 23 moving through the bed or mass of material contained in the compartment GC. A very thorough mixing and turning of the material is thereby achieved; the immence amount of hard labor required in turning and mixing the compost manually is entirely eliminated; and the disadvantages noted above in connection with the drum-type mixers are overcome.

Aeration of the compost during fermenting or growing mushroom spawn is effected by drawing air through the bed of compost in the compartment GC, preferably as follows: Air that has been properly conditioned with respect to temperature, moisture, and percentage of oxygen is blown into the building through a suitable conduit 30 (Fig. 2) disposed above said compartment. The air is then drawn through the compost by exhaust fans 31 disposed in air ducts 32 which may be built into one end of the exhaust air-chamber EC, and which may discharge into a flue 33 communicating with atmosphere, or with the building space above the tank 10 by means of a vent 34 and damper 34a permitting recirculation of the air and also providing a natural draft effect. The conditioning of the air and the rate of its movement through the compost will vary with the kind of compost, the stage of fermentation, the growing of the spawn or mycelium, the stage of growth thereof, the necessity for increasing or decreasing the temperature of the compost, and the percentages of carbon dioxide and oxygen in the exhaust air. The respiratory quotient (ratio of $CO_2:O_2$) is determined by an automatic, registering gas analyzer (not shown) which may be located in the exhaust air duct. The percentage of $O_2$ and $CO_2$ in the air is controlled either by the rate of air movement or by recirculating the exhaust air. An operator skilled in the practice can control the aeration by a knowledge of the temperature of the air and of the compost, and an analysis of the exhaust air.

Figure 4:
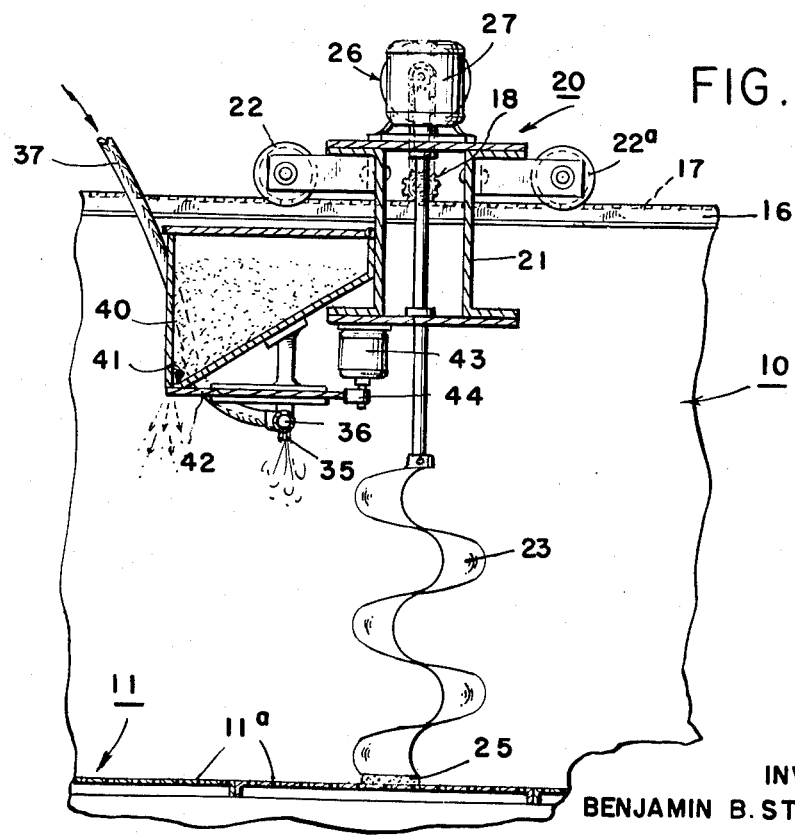
Fig. 4 is a section taken on line 4—4 of Fig. 3.

The moisture content of the compost may vary from 40% to 90%, depending on the ingredients of the compost and the nature of microbial activity. Preferably, however, the moisture is adjusted for 60% to 75% at the start of the fermentation and is reduced to 50% to 60% at the end. The moisture content of the compost is easily increased by a spray produced by spray nozzles 35 uniformly spaced on a water pipe 36 which is mounted permanently on the turning machine (Figs. 3 and 4). A rubber hose 37 and water meter (not shown) are attached to one end of the pipe. The water is sprayed on the compost in a continuous sheet ahead of the turning machine as it travels the length of the compartment; so that the water is mixed throughout the compost as it is sprayed. When the moisture of the compost is to be reduced to 10% to 40% so that the compost can be stored or shipped, then warm air with a low or zero relative humidity is drawn through the compost.

It will be seen from the above that composts, "synthetic composts," and organic fertilizers may be prepared from various ingredients by a rapid, thermophilic fermentation. The ingredients for composts for mushroom culture are described in my publication, "Preparation of Synthetic Composts for Mushroom Culture," Plant Physiology, vol. 18: 397–414, 1943. But composts for other crops may need more or less of N, $P_2O_5$ and $K_2O$. All kinds of wastes, residues, and by-products of industry, agriculture and the home may be used in the preparation of composts by the method of the invention.

The duration, rapidity, and maximum temperatures of the fermentation will depend upon, not only the proper assortment of nutrients, both mineral and organic, but also upon the subdivision of the materials. The reduction of the ingredients, especially the carbohydrate-containing or cellulosic materials, to fine particles or a powder (20 to 200 mesh), but at the same time held or arranged so as not to obstruct unduly the passage of air through the fermenting mass, will shorten the duration of the fermentation and allow maximum temperatures to be obtained rapidly without any outside source of heat. When such fine particles are used, they must either be built up to a relatively thin layer in the compartment GC, or, preferably, mixed with a variable proportion of coarse particles (10 mesh to 1 mesh and larger) such as particles of cereal straw, two to six inches long, bark waste from paper mills, spent licorice roots, bark and other spent plant waste from tanneries, coarse peat, blown vermiculite, slag, cinders, combinations of peat and mineral particles, nut shells, and fibrous plant residues and wastes of various kinds. The proportion of fine to coarse particles should be so related that aeration is not impaired; that is to say, so as not to produce anaerobic conditions in the mass, or so as to prevent a high temperature from being attained in the mass, or so as not to require an impractical expenditure of power to draw air through the mass.

Inoculation of the fermenting mass with microbes is not required, by may be done at the start of the microbial decomposition, although if materials such as animal manures and many plant products are used to make the compost, there is usually a sufficiency of a microbial population already present on these materials as not to require microbial inoculation as aforesaid, since the microbes start multiplying as soon as the conditions of moisture, temperature, aeration and availability of nutrient are found in their environment. However, when specific biochemicals or a particular kind of microbial matter is to be produced during the fermentation, the inoculation with specified microorganisms is required. For example, if it is desired to produce a predominance of yeast in the finished compost, so as to obtain a compost rich in vitamins and yeast proteins, then a yeast inoculum, such as *Torula utilis*, is employed. The yeast inoculum is subcultured, by the diverse methods known in the science of microbiology, in a sufficiently large tank to produce the required amount of inoculum. The material to be fermented in the compartment GC may be then sprayed with the inoculum by the same mechanism employed to spray water, but using spray nozzles to suit the viscosity of the liquid inoculum, and mixed at the same time as the material of the mass by the turning machine 20. Special media may be sprayed in addition to the yeast inoculum; as, for example, a diluted solution of molasses may be sprayed on to the mass prior to, after, or at the same time the yeast inoculum is sprayed. Also, the material of the mass may be made more favorable for the desired organism inoculated by pasteurizing, as by drawing live steam through the bed or mass of compost and raising its temperature to 140° to 170° F. before inoculation.

According to the invention, specific biochemical products like antibiotics, pigments, essential oils, vitamins, enzymes, hormones, and alkaloids, synthesized by microorganisms, may be recovered by extraction of the fermenting mass with aqueous or organic solvents and then evaporating the solvent or excess moisture as by suction prior to inoculating the compost with mushroom spawn, or the yield and value of the biochemical derived may be sufficient without further use of the mass of material for mushroom growing. The inoculum may be a liquid as described above for the yeast, or a solid material as will be described later for mushroom spawn.

A mesophilic or thermophilic fermentation may be instituted at the start of the fermentation, with or without a mesophilic or thermophilic organism, by raising the temperature of the material to be fermented to the appropriate level as by drawing live steam through the material. The rapidity of the fermentation may be increased by starting with the proper temperature.

When the method is employed for the preparation of a compost for mushroom culture, the finished compost resulting from completion of the fermentation (requiring two to nine days) is prepared for inoculation with mushroom mycelium or "spawn." Insects which may have been driven out by the heat generated in the fermenting mass and crawled up the walls of the compartment, on the turning machine, track rails and over into the alleys of the building, or which are on the wing in the building, are destroyed, preferably by generating live steam into the air so that the air temperature is raised to 130° F. to 150° F. and held at this temperature for about six to twenty-four hours. Fumigation with hydrocyanic acid and other chemicals may be practiced, but steam is preferable because it will kill both insects and undesirable microbes spread by the insects, and at the same time have no injurious effect on the compost or corrode the machinery.

When the compost has cooled down to 70° F. to 85° F., it is inoculated with spawn. To effect such inoculation, crumbled particles of spawn or "grain spawn" (grain overgrown with mushroom mycelium) are distributed evenly over the surface of the compost in the compartment, and are mixed into and evenly distributed throughout the bed of compost by the turning machine 20. In order to distribute the spawn evenly over the compost, a hopper or trough 40 extending the width of the tank 10 may be mounted on the turning machine for movement therewith, and particles of spawn are allowed to fall through a slit-like discharge opening 41 in the bottom of the trough, and to drop on the surface of the compost ahead of the turning machine, so that the spawn is mixed throughout the bed of compost as it falls from the trough. Several trips by the turning machine may be required in order to distribute a sufficient quantity of spawn, depending on the thickness of the bed of compost. The slit 41 in the bottom of the trough may be alternately closed and opened by a rapidly reciprocating plate 42 driven by suitable means such as a small motor 43 carried on the underside of the beam 11 and effecting reciprocatory or vibratory motion of the plate by means such as a cam or eccentric pin and slot arrangement schematically indicated at 44.

The spawn for the inoculum may be prepared by several procedures. The original inoculum is prepared from a pure culture under sterile conditions, as is the usual practice. Since the spawn is grown rapidly in the compartment GC under ideal conditions of temperature, humidity, and aeration, and is effectively screened and protected from insect and microflora pests, the compost permeated throughout with spawn of one batch, may be used to inoculate a subsequent batch. But in case of obvious contamination or to counteract a deviation of the strain from the pure culture, this procedure may be altered so that some of the finished compost is transferred to trays or a drum and inoculated with pure culture spawn. After the mycelium has permeated the compost in the trays or drum, it is then used to inoculate the compost of a subsequent batch in the compartment GC. When bottles of pure culture are used to inoculate a batch of the compost in the compartment directly, the compost is mixed by the turning machine after three to six days; by such mixing, the centers of inoculation are increased many times, and the mycelium is still rapidly grown throughout the bed of compost.

After the compost is inoculated with spawn, several procedures may be followed. Instead of allowing the mushroom mycelium to continue to grow in the compost in the compartment, the compost may be transferred to trays where the growth is completed, or the spawn may be allowed to graw in the mass of compost in the compartment for a period of from five to seven days, where-upon the compost is mixed and turned thoroughly by the turning machine, and then transferred to trays. After the spawn has grown in the compost for five to seven days and mixed thoroughly, as above, it is allowed to grow four days longer, mixed thoroughly again, and then transferred to trays. In another procedure the spawn may be allowed to grow four days longer, or a total of fourteen days, mixed and transferred to trays. If the compost through which the spawn has permeated is to be stored or shipped long distances as for the consumer trade, it is dried by drawing dry air through it while it is being mixed by the turning machine. The temperature of the air is gradually increased to 90°–100° F. as the compost dries down to 10% to 35% moisture. The procedure that will be followed will be decided essentially by economic factors such as the effect of the outside temperature on the cost of cooling or heating the air in the compartment, the need for the compartment for preparing compost, etc. The number of times the compost will be mixed and turned while the spawn is growing, will depend upon the rapidity of mycelial growth; matting together of the compost by mycelial growth will impair aeration in the compartment, so that turning of the compost periodically is required. When a relatively thick layer of compost is inoculated with spawn, so that the rapid growth of the spawn or some residual microbial activity causes an undesirable increase in temperature of the compost, cold air employed to lower this temperature may be blown into the compost alternately from above and below, and exhausted accordingly, so as to cool the compost rapidly and uniformly. An alternative for this condition also is to turn the compost permeated with spawn as it is cooled, if breaking up the mat is desirable at that time.

In transferring the compost from the compartment the door 15 at the end of the compost compartment is opened, and the compost may be pushed down a chute 50, elevated by a conveyor 51, and dropped into trays 52. The turning machine 20 may be used as an aid to push the compost from the compartment. The spawn-permeated compost is then tamped in the trays, covered with a one-inch thick layer of peat or soil (pH 7.0), and is then ready for fructification or production of mushrooms when the tray is incubated in a humid atmosphere at 50° F. to 60° F.

A summary of a typical batch run is as follows: the compartment is filled with fresh manure and its straw bedding through a chute 55 and the turning machine 20 is run up and down the length of the compartment, spraying the manure with water and mixing and leveling the bed of manure. Air is drawn through the bed of manure and through the perforated floor trays forming the false bottom 11 by the exhaust fan 31 in the ducts 32 of the exhaust air chamber EC. At first, the air is drawn through slowly, or the air is recirculated so that $CO_2$ in the exhaust air is held at less than 10%. As the temperature in the compost increases, the air is exhausted faster, so that the exhaust air analysis is less than 5% $CO_2$ and the temperatures reach about 140° F. in the compost. After about twenty-four hours and periodically thereafter, the turning machine is operated to turn, mix, and break up the clumps of compost. Water is added to the compost when required while it is being mixed. After about six days of composting, live steam is generated into the air above the compartment GC and into the exhaust air chamber EC so that the temperature of the air in both is raised to about 140° F., and is held at this temperature for about twelve hours. The compost is then allowed to cool gradually by drawing cold air through the compost. When the temperature of the compost is reduced to about 70° F. to 75° F., spawn may be spread over the compost and mixed throughout the compost with the turning machine 20 as described in the foregoing. Air is continuously drawn through the compost while the spawn is growing and the temperature in the compost is maintained at about 70° F. The spawn is allowed to grow in the compost for six days and is turned periodically. Then the temperature is lowered and maintained at 60° F. for four days. At the end of this period the compost is filled in trays, tamped, and covered with casing soil. The trays are then incubated in a humid atmosphere at 50° F. to 60° F. for the production of mushrooms.

The fermentation is standardized for a specific kind of ingredient, for different sources of ingredients, for different kinds of microbial inoculums, and for different pasteurizing procedures, by establishing a relationship between the loss in dry weight of the compost, and the increase in percent ash, to the temperature in the compartment and the carbon dioxide in the exhaust air. The loss in dry weight of the compost may be determined by weighing representative samples of the compost in wire cages, made of a very fine mesh so that no material is lost, and submerging the cages in the compost in the compartment. By weighing the cages daily and determining the moisture, and the percent ash, the daily loss in dry weight can be determined. When the loss in dry weight is 15% to 30%, the fermentation is considered completed, although the percentage can vary greatly from this range, especially when non-fermentable ingredients like slag, cinders, or peat are used, or a specific organism is inoculated or is induced to predominate.

The advantages and improvements of the method and apparatus described herein, are as follows: (1) The apparatus consists principally of a concrete structure which is an integral part of the building housing the structure, and a mixer operating within the structure. (2) The floor space in the building is occupied, for the most part, by the bulk of the product being prepared. (3) The quantity of machinery per unit capacity for manufacturing is low. (4) The composting or microbial decomposition can be completed in two to nine days compared with a period of some thirty days in the present practice. (5) The immense amount of hard labor in turning and mixing the compost is eliminated. (6) The "sweating out process" as usually followed in the practice of mushroom culture can be eliminated by integrating this process with the process of composting. (7) A rapid, mechanized method for planting the spawn is developed to replace the slow hand-labor of planting the spawn. (8) Upon inoculation, the spawn is distributed throughout the compost, where many particles of spawn are not more than one to three inches apart, instead of in fixed places, seven to ten inches apart, as is the usual practice at present; accordingly, the compost becomes permeated with spawn in six to eleven days, instead of six to ten weeks. (9) Biochemicals synthesized by microbial activity can be recovered in the process of preparing composts for mushroom culture. (10) Thermophilic or other preferred microbes can be easily established to predominate over the microflora prevailing in the compost. (11) The finished compost and the compost permeated with spawn can be dried for storage without requiring special drying equipment. (12) Insect and other pests are effectively destroyed and their spreading is prevented. (13) The degree of fermentation can be controlled by standardization, so that the loss in dry weight of the ingredients of the compost is held to a minimum, and so more of the compost is available for the production of a higher yield of mushrooms. (14) The production of mushrooms can be increased, and produced at a lower cost.

As many changes could be made in carrying out the above constructions without departing from the scope of the invention, it is intended that all matter contained in the above description or shown in the accompanying drawings shall be interpreted as illustrative and not in a limiting sense.

I claim:

1. The method of composting a mixture of organic and mineral materials which comprises the steps of: building up a bed of said mixture in an open-top compartment having a perforated bottom, mixing and turning said mixture progressively for the length of the bed, and aerating the mixture, by introducing conditioned air into the top of the bed, drawing said air therethrough and withdrawing it through the perforated bottom, for the time period required to effect a thermophilic fermentation of said mixture.

2. The method of composting a mixture of organic and mineral materials which comprises the steps of: building up a bed of said mixture in an open-top compartment having a perforated bottom, mixing and turning said mixture simultaneously throughout a width zone of the bed and thereupon progressively for substantially the full length of the bed, and aerating said mixture, by exhausting conditioned air drawn into the top of the bed and therethrough through the perforated bottom, for the time period required to effect a thermophilic fermentation of said mixture.

3. The method of composting a mixture of organic and mineral materials which comprises the steps of: building up a bed of said mixture in an open-top compartment having a perforated bottom, mixing and turning said mixture simultaneously throughout a width zone of the bed and thereupon progressively for substantially the full length of the bed, and aerating said mixture, by continuously exhausting conditioned air drawn into the top of the bed and therethrough through the perforated bottom, for a period of from two to nine days to effect a thermophilic fermentation of said mixture.

4. The method of composting a mixture of organic and mineral materials which comprises the steps of: building up a bed of said mixture in an open-top compartment having a perforated bottom, adjusting the moisture content of the mixture in accordance with the ingredients thereof and the nature of the microbial activity desired therein, mixing and turning said mixture progressively for the length of the bed, and aerating said mixture, by introducing conditioned air into the top of the bed, drawing said air therethrough and withdrawing it through the perforated bottom, for the time period required to effect a thermophilic fermentation of said mixture.

5. The method of composting a mixture of organic and mineral materials which comprises the steps of: building up a bed of said mixture in an open-top compartment having a perforated bottom, adjusting the moisture content of the mixture in accordance with the ingredients thereof and the nature of the microbial activity desired therein, mixing and turning said mixture progressively for the length of the bed, aerating said mixture, by introducing conditioned air into the top of the bed, drawing said air therethrough and withdrawing it through the perforated bottom, for the time period required to effect thermophilic fermentation of said mixture, and varying the rate of air withdrawal during the course of said aeration in accordance with the moisture content and the temperature of the mixture desired during and upon completion of the fermentation.

6. The method of producing a specified product resulting from the microbial decomposition and fermentation of a mixture of organic and mineral materials which comprises the steps of: building up a bed of the mixture in an open-top compartment having a perforated bottom, mixing and turning the mixture progressively for the length of the bed, inoculating the mixture with a microorganism selected for its property of bringing about microbial decomposition of the mixture and the production therein of the specified product, aerating said mixture continuously during the fermentation period by introducing conditioned air into the top of the bed, drawing said air therethrough and exhausting it through the bottom thereof, and extracting and recovering the specified product from the mixture upon completion of the fermentation.

7. The method of producing a specific biochemical from a mixture of organic and mineral materials, which comprises the steps of: building up a bed of the mixture in an open-top compartment having a perforated bottom, mixing and turning the mixture progressively for the length of the bed, inoculating the mixture with a microorganism capable of synthesizing the biochemical to be produced by the microbial activity occurring within the mixture, continuously aerating the mixture by drawing in conditioned air through the top of the mass and therethrough and exhausting it through the perforated bottom thereby to obtain microbial decomposition and fermentation of the mixture, extracting the biochemical from the mixture upon completion of the fermentation by treating the mixture with a solvent, and evaporating the solvent thereby to recover the biochemical.

8. The method as set forth in claim 6, and the further steps of moistening and pasteurizing said mixture prior to inoculation thereof, thereby to render the mixture more favorable for the microbial activity and decomposition.

9. The method as set forth in claim 6, and the further step of passing steam through the bed prior to inoculation thereof.

10. The method of preparing a compost for mushroom culture and of growing mushrooms which includes the steps of: building up a bed of a mixture of compostable materials in a compartment having a perforated bottom, mixing and turning the mixture simultaneously throughout a width zone of the bed and thereupon progressively for the length of the bed, continuously aerating said mixture, by introducing conditioned air into the top of the bed, drawing said air therethrough and withdrawing it from the bottom of the bed through the perforated bottom, for the time period required to complete a thermophilic fermentation of the mixture, and inoculating the fermented mixture with mushroom spawn.

11. The method of preparing a compost for mushroom culture and of growing mushrooms which includes the steps of: building up a bed of a mixture of compostable materials in a compartment having a perforated bottom, mixing and turning the mixture simultaneously throughout a width zone of the bed and thereupon progressively for the length of the bed, continuously aerating said mixture by introducing conditioned air into the top and withdrawing it from the bottom of the bed through the perforated bottom for the time period required to complete a thermophilic fermentation of the mixture, and inoculating the fermented mixture with mushroom spawn, said inoculation being effected by spreading the spawn on the surface of the bed and thereupon distributing the spawn throughout the mixture by repeating the step of mixing and turning.

12. The method of preparing a compost for mushroom culture and of growing mushrooms which includes the steps of: building up a bed of a mixture of compostable materials, adjusting the moisture content of the bed to that inducing fermentation, mixing and turning the mixture simultaneously throughout a width zone of the bed and thereupon progressively for the length of the bed, continuously aerating said mixture by introducing conditioned air into the top and withdrawing it from the bottom of the bed, for the time period required to complete a thermophilic fermentation of the mixture, cooling the mixture, distributing mushroom spawn throughout the fermented mixture in said compartment, continuously aerating said mixture for a time period allowing the mushroom mycelium to grow a predetermined amount, and finally removing the mixture and the mycelium from the compartment in small quantities for subsequent fructification of the mycelium.

13. The method of preparing a compost for mushroom culture and of growing mushrooms as set forth in claim 12, wherein the mixture and distributed spawn is further mixed and turned after a predetermined period of growth of the mycelium, thereby to increase the centers of inoculation, and thereby increase distribution of the spawn throughout the mixture.

14. The method of preparing a compost for mushroom culture and of growing mushrooms as set forth in claim 12, wherein, prior to inoculation of the mixture with spawn, live steam is injected into the air above, around and below the compartment, thereby to raise the temperature thereof to about 130°–150° F. for a time period such that insects and undesirable microbes are exterminated and growth of the spawn is accelerated.

15. The method of producing a specified product resulting from the microbial decomposition and fermentation of a mixture of organic and mineral materials which comprises the steps of: building up a bed of the mixture in an open-top compartment having a perforated bottom, mixing and turning the mixture progressively for the length of the bed, inoculating the mixture with a micro-organism selected for its property of bringing about microbial decomposition of the mixture and the production therein of the specified product, aerating said mixture continuously during the fermentating period by introducing conditioned air into the top of the bed, drawing said air therethrough and exhausting it through the bottom thereof.

16. The method of producing a compost resulting from the microbial decomposition and fermentation of a mixture of organic and mineral materials which comprises the steps of building up a bed of the mixture in an open-top compartment having a perforated bottom, mixing and turning the mixture progressively for the length of the bed, inoculating the mixture with a micro-organism selected for its property of bringing about microbial decomposition of the mixture and the production therein of the specified product, aerating said mixture continuously during the fermentating period by introducing conditioned air into the top of the bed, drawing said air therethrough and exhausting it through the bottom thereof, extracting the specified product from the fermented mixture upon completion of the fermentation, said fermentation after specified product extraction comprising said compost.

17. The method of claim 16 characterized by the additional step of inoculating said compost with mushroom spawn.

18. The method of producing a compost resulting from the microbial decomposition and fermentation of a mixture of organic and mineral materials which comprises the steps of: building up a bed of the mixture in an open-top compartment having a perforated bottom, mixing and turning the mixture progressively for the length of the bed, inoculating the mixture with a micro-organism selected for its property of bringing about microbial decomposition of the mixture and the production therein of the specified product, aerating said mixture continuously during the fermentating period by introducing conditioned air into the top of the bed, drawing said air therethrough and exhausting it through the bottom thereof, extracting the specified product from the fermented mixture upon compleion of the fermentation, said fermented mixture after specified product extraction comprising said compost, and inoculating said compost by spreading the spawn on the surface of the bed and thereupon distributing the spawn throughout the mixture by repeating the step of mixing and turning.

19. The method of composting a mixture of organic and mineral materials which comprises the steps of: building up a bed of said mixture in an open-top compartment having a perforated bottom, continuously mixing and turning said mixture progressively for the length of the bed, and simultaneously aerating the mixture, by introducing conditioned air into the top of the bed, drawing said air therethrough and withdrawing it through the perforated bottom, for the time period required to effect a thermophilic fermentation of said mixture.

References Cited in the file of this patent

UNITED STATES PATENTS

| Number | Name | Date |
|---|---|---|
| 26,110 | Jerome | Nov. 15, 1859 |
| 175,210 | Turman | Mar. 21, 1876 |
| 500,305 | Tilden | June 27, 1893 |
| 549,856 | Prinz | Nov. 12, 1895 |
| 794,313 | Rice | July 11, 1905 |
| 805,801 | Kline | Nov. 28, 1905 |
| 1,773,648 | Steves | Aug. 19, 1930 |
| 1,808,383 | Steves | June 2, 1931 |
| 1,832,593 | Szucs | Nov. 17, 1931 |
| 2,034,678 | Knaust | Mar. 17, 1936 |
| 2,043,265 | Roeder | June 9, 1936 |
| 2,060,223 | Lambert | Nov. 10, 1936 |
| 2,095,323 | DiMarino | Oct. 12, 1937 |
| 2,097,766 | Knaust | Nov. 2, 1937 |
| 2,474,833 | Eweson | July 5, 1949 |

FOREIGN PATENTS

| Number | Country | Date |
|---|---|---|
| 710,023 | France | May 26, 1931 |
| 837,229 | France | Nov. 3, 1938 |